US012385608B2

(12) United States Patent
Wang

(10) Patent No.: US 12,385,608 B2
(45) Date of Patent: Aug. 12, 2025

(54) LIGHTBULB

(71) Applicant: SIGNIFY HOLDING B.V., Eindhoven (NL)

(72) Inventor: Huansi Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/849,090

(22) PCT Filed: Mar. 16, 2023

(86) PCT No.: PCT/EP2023/056699
§ 371 (c)(1),
(2) Date: Sep. 20, 2024

(87) PCT Pub. No.: WO2023/180152
PCT Pub. Date: Sep. 28, 2023

(65) Prior Publication Data

US 2025/0198576 A1 Jun. 19, 2025

(30) Foreign Application Priority Data

Mar. 22, 2022 (WO) ................ PCT/CN2022/082290
Apr. 19, 2022 (EP) .................................... 22168801

(51) Int. Cl.
*F21K 9/69* (2016.01)
*F21K 9/232* (2016.01)
(Continued)

(52) U.S. Cl.
CPC ................ *F21K 9/69* (2016.08); *F21K 9/232* (2016.08); *F21V 5/043* (2013.01); *F21Y 2115/10* (2016.08)

(58) Field of Classification Search
CPC . F21K 9/69; F21K 9/232; F21V 5/043; F21Y 2115/10
See application file for complete search history.

(56) References Cited

U.S. PATENT DOCUMENTS 5,899,557 A * 5/1999 McDermott ............ F21V 5/046 362/244
8,816,576 B1 8/2014 Erion et al.
(Continued)

FOREIGN PATENT DOCUMENTS

JP 2002157914 A * 5/2002 ............... F21K 9/66
WO 2016012226 A1 1/2016

OTHER PUBLICATIONS

English translation of Ogawa JP-2002157914-A (Year: 2002).*
(Continued)

*Primary Examiner* — Evan P Dzierzynski

(57) ABSTRACT

Provided is a lightbulb that is configured such that the light source of the lightbulb has a reduced visibility. This is achieved by the provision of a lens arrangement comprising an outer convergent lens. The outer convergent lens converges light rays that enter the outer convergent lens at a same first angle to establish a shadow region. The shadow region is a volume in the lightbulb in which light rays incident to the outer convergent lens at a first angle may not be incident. Put another way, light rays input at the first angle may avoid the shadow region. Thus, by positioning the light source at least partially within the shadow region, the light source may be obscured when viewed from certain viewing angles. In this way, an aesthetic appeal of the lightbulb may be improved, as the light source is not visible from some viewing angles.

13 Claims, 6 Drawing Sheets

(51) Int. Cl.
*F21V 5/04* (2006.01)
*F21Y 115/10* (2016.01)

(56) References Cited

U.S. PATENT DOCUMENTS

| | | | | |
|---|---|---|---|---|
| 9,759,389 | B2 * | 9/2017 | Bergmann | F21V 23/006 |
| 2017/0212338 | A1 * | 7/2017 | Vissenberg | F21V 3/02 |
| 2017/0370529 | A1 | 12/2017 | Zantop | |

OTHER PUBLICATIONS

Liu, Elizabeth, "Invisibiity Cloak May Become Reality," the Johns Hopkins News-Letter, Published by the Students of Johns Hopkins, Sep. 17, 2024, URL: https://www.jhuneewsletter.com/article/2014/10/invisibility-cloak-may-become-reality-41363 (5 Pages).
URL: https://www.rochester.edu/newscenter/watch-rochester-cloak-uses-ordinary-lenses-to-hide-objects-across-continuous-range-of-angles-70592, "Invisibility Cloaking Device Hides Objects Across Range of Angles," University of Rochester, Newscenter, Sep. 25, 2014 (8 Pages).
Hager-Barnard, Lizzie, URL: https://nisenet.org/sites/default/failes/rochestercloak-nisenet.pdf, "Building Your Own "Invisibility Cloak" Using Lenses," Nanoscale Informal Science Education, Last Retrieved Sep. 17, 2024 (6 Pages).
Choi, Joseph, "Practical Invisibility Cloaking," The Institute of Optics, School of Engineering & Applied Sciences, University of Rochester, Apr. 5, 2016 (49 Pages).

* cited by examiner

LIGHTBULB

CROSS-REFERENCE TO PRIOR APPLICATIONS

This application is the U.S. National Phase application under 35 U.S.C. § 371 of International Application No. PCT/EP2023/056699, filed on Mar. 16, 2023, which claims the benefit of International Application No. PCT/CN2022/082290, filed on Mar. 22, 2022 and European Patent Application No. 22168801.3, filed on Apr. 19, 2022. These applications are hereby incorporated by reference herein.

FIELD OF THE INVENTION

The present invention relates to the field of lighting, and in particular, to the field of lightbulbs.

BACKGROUND OF THE INVENTION

Typically, lightbulbs comprise a light source enclosed in a transmissive, e.g., transparent or translucent bulb, a bulb housing that provides mechanical support and electrical connections for the light source, and a lightbulb plug for fitting the lightbulb to a lightbulb receiving socket. The light source of traditionally used incandescent lightbulbs includes a thin wire filament that is heated until it glows. The appearance of such incandescent lightbulbs is often considered an advantage.

Recently, due to durability and power-saving advantages, wire filaments have been replaced by alternative light sources, such as light emitting diodes (LEDs) in the shape of a string which emulates the tungsten filament, and thus are called LED filaments. Such light sources may be unattractive when directly viewed in an off state because such LED filaments look like a thick yellow bar (if it's straight) or rope (if it's curved). As a result, it is beneficial to combine the obvious advantages associated with the use of alternative light sources, such as improved power efficiency, with the more attractive look of a traditional filament light source.

Moreover, a number of light sources can cause glare and discomfort when directly viewed by an individual. This is particularly prevalent with recent light source developments, such as LEDs, due to the highly efficiency generation of light within a relatively small area of the light source.

Thus, there exists a desire to improve the appearance of a lightbulb that makes use of a non-incandescent light source and/or to reduce a glare to a viewer of a lightbulb.

SUMMARY OF THE INVENTION

The invention is defined by the claims.

According to an aspect of the invention, there is provided a lightbulb for decreasing a visibility of a light source of the lightbulb, the lightbulb comprising: the light source; and a lens arrangement comprising: an outer convergent lens configured to converge light rays that enter the outer convergent lens at a same first angle to thereby define a shadow region, being a region in the lightbulb avoided by the light rays that enter the outer convergent lens at the first angle as a result of the converging performed by the outer convergent lens, wherein the light source is positioned such that at least part of the light source is in the shadow region defined by the outer convergent lens.

Embodiments provide a lightbulb with a light source having a reduced visibility. This is achieved by the provision of a lens arrangement comprising an outer convergent lens.

The outer convergent lens converges light rays that enter the outer convergent lens at a same first angle (with respect to an optical axis) to establish a shadow region. The shadow region is a volume in the lightbulb through which light rays incident to the outer convergent lens at this first angle (with respect to the optical axis) do not pass. Put another way, light rays input at the first angle avoid the shadow region. Thus, by positioning the light source at least partially within the shadow region, the light source may be obscured when viewed from certain viewing angles. In this way, the light source can be at least partially shielded from view, reducing a glare effect on an individual viewing the light bulb and improving an aesthetic appeal of the lightbulb may be improved, as the light source is not visible from some viewing angles.

Indeed, embodiments of the invention provide a lens arrangement configured to cloak/obscure/reduce visibility of at least part of a light source of a lightbulb. More particularly, this is achieved by an outer convergent lens, which focusses light incident to the lightbulb, such that the light incident to the lightbulb at certain angles is not incident upon the light source. As a result, the light source may not be imaged at certain angles, meaning the light source may not be seen at all viewing angles of the lightbulb. In this way, a glare effect of the lightbulb can be reduced and a visual appeal of the lightbulb may be improved.

In other words, an outer convergent lens provides a shadow/cloaking region in which a light source may be positioned in order to be obscured from observation at a first angle. The shadow region (i.e. region of non-incidence, or a non-imaged region) is a region in which light rays that enter the outer convergent lens at a specific angle may not travel through/be incident to. Thus, when viewed from the first angle, the light source may not be imaged. Indeed, any object in the shadow region may not be imaged at the first angle.

Accordingly, provided by the invention are lightbulbs having a light source which has a reduced visibility. Put another way, the provided lightbulbs have a light source that is obscured from view or is cloaked when the lightbulb is observed from certain viewing angles. This may be particularly advantageous, for example, when the light source has an unattractive form or might cause a glare effect if directly viewed by an individual.

The light source may be any light source suitable for providing illumination from a lightbulb. For example, the light source may be a filament, one or more LEDs, or a fluorescent light source. In any case, at least part of the light source must be positioned/arranged to be in the shadow region. This means that some or all of the light source may be in the shadow region. Of cause, it will be appreciated that some of the light source may not be in the shadow region, and therefore may be visible from the first angle.

In some embodiments, the outer convergent lens may be formed in a torus shape and may be positioned to surround the light source.

As a result, visibility of a light source may be reduced in many directions around the lightbulb. Also, when provided in a torus shape around the lightbulb, the light rays that enter the outer convergent lens at a same first angle with respect to an optical axis may be incident to the other side of the outer convergent lens, and therefore may be subsequently converged when exiting the outer convergent lens.

Put another way, the outer convergent lens may be provided in a loop around the light source, thus surrounding the light source in all directions, e.g. within a plane in which the light source lies.

In some embodiments, the shadow region may be a volume corresponding to an intersection of a volume surrounded by the torus shape of the outer convergent lens and a volume avoided by the parallel light rays that enter the outer convergent lens at the first angle as a result of the converging performed by the outer convergent lens.

Thus, the light source positioned at least partially in the shadow region may be surrounded by the outer convergent lens, so that it is cloaked (i.e. not visible) from a range of viewing angles.

In some embodiments, the light source may be provided in a torus shape that is concentric with the outer convergent lens.

In this way, the illumination provided by the light source may have an even output profile. Indeed, this may also take advantage of a large amount of the shadow area, allowing the light source to be large while also still being obscured from view.

In some embodiments, the outer convergent lens may have a convex shaped cross section. Thus, light rays that enter the outer convergent lens at a same first angle with respect to an optical axis may be redirected by refraction so that they converge, thereby defining a shadow region. Alternatively, it should be appreciated that there exist other lenses suitable for converging light, which converge light due to different lens shapes, material compositions, etc. A suitable example is a Fresnel lens. Alternatively, the lens may be a metalens, being a lens made from a meta material (i.e. a composite material having a structure such that it exhibits properties not usually found in the natural material, such as a selected refractive index).

It will be appreciated that, after being converged by the outer convergent lens, the converged light rays may form diverging light rays (e.g., after passing a focal point). The lens arrangement may further comprise an inner convergent lens configured to receive the diverging light rays and reconverge the diverging light rays to thereby define a second shadow region, being a region in the lightbulb avoided by the light rays that enter the outer convergent lens at the first angle as a result of the converging performed by the outer convergent lens and the reconverging performed by the inner convergent lens.

In other words, light rays that form converging light rays eventually form diverging light rays (i.e. past a focal point). Thus, by providing an inner converging lens, the diverging light rays may then re-converge to define a second shadow region.

The first and second shadow regions may overlap one another. In particular, if the outer convergent lens is in the shape of torus, then the first shadow region may also be ring-like. The inner convergent lens may be configured so that the second shadow region defined by the area avoided by the reconverging rays overlaps the first shadow region. This approach further reduces the visibility of the light source positioned in the first shadow region.

The focal point of the outer converging lens for light rays at a first angle may lie between the outer converging lens and the inner converging lens, so that the light rays are diverging when incident to the inner converging lens. The inner converging lens may then converge said light rays to a focal point between the inner converging lens and a second part of the outer converging lens before once again diverging incident to the outer converging lens. The outer converging lens may then reconverge the diverging light rays so that they may be output from the lightbulb at a same angle (from the optical axis) as the first angle (from the optical axis).

In this way, the light rays may be re-aligned so that an output image may be at the same orientation as the input image. This means that the observed image is not flipped. As a result, the image seen by an observer may be substantially the same as though the lens arrangement, and indeed the light source, is not there. Essentially, this allows a user to see through the lightbulb without the image seen being flipped/reversed.

In some embodiments, the light source may be positioned such that at least part of the light source is in the second shadow region defined by the inner convergent lens. The light source may be positioned so that at least part of the light source is in the first shadow region and the second shadow region, which may overlap one another.

In some embodiments, the inner convergent lens may be formed in a torus shape and may be positioned concentrically with the outer convergent lens.

Indeed, should the inner convergent lens be formed in a torus shape concentric with the torus shaped outer convergent lens, then incident light rays may be redirected in a similar manner no matter the direction around the outer convergent lens from which the light rays originate.

In some embodiments, the inner convergent lens may have a convex shaped cross section.

In some embodiments, the inner convergent lens may be formed in a spherical shape. As a result, the lens arrangement may have a relatively compact, using less material and facilitating smaller lightbulbs.

In some embodiments, the lightbulb may further comprise an enclosure for housing the lens arrangement and the light source, wherein the enclosure is formed of a transmissive, e.g., transparent or translucent material, and preferably a transparent material. Alternatively, the enclosure might be partially transparent and partially scattering.

In some embodiments, the enclosure may comprise the outer convergent lens.

Accordingly, by integrating the outer convergent lens with the enclosure, the lightbulb may have a compact shape. Indeed, light bulbs tend to have a convex shape, which may mean that the outer convergent lens can be integrated seamlessly with the enclosure (given an outer convergent lens having a convex cross sectional shape).

In some embodiments, a light exit window of the light source may face at least a part of the enclosure other than the outer convergent lens. Thus, a luminous efficiency of the lightbulb may be improved by avoiding the luminous efficiency loss associated with light travelling through a lens.

In some embodiments, the enclosure may have a candle flame shaped, a pear shaped, a mushroom shaped or a circular shaped cross section.

In some embodiments, the light source may comprise a plurality of light emitting diodes. LEDs are particularly durable and efficient sources of illumination, and therefore the light source comprising a plurality of LEDs may enable the lightbulb to have a high efficiency and long operational lifespan.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1A:
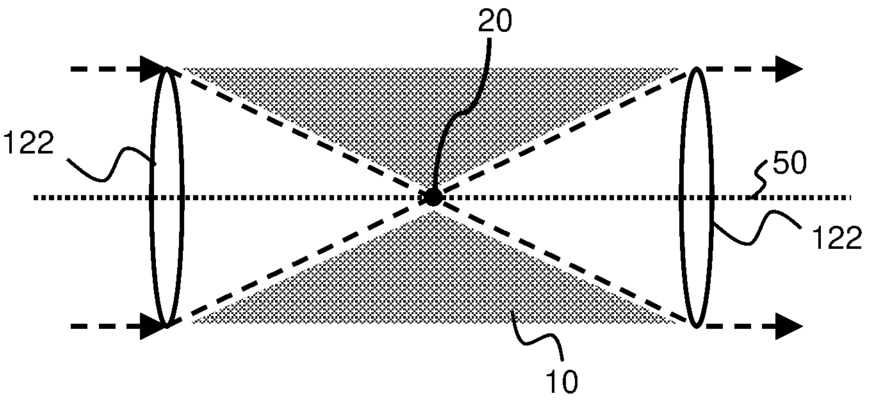
FIGS. 1A, 1B and 1C illustrate light paths formed by a lens arrangement according to various embodiments.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

According to proposed concepts, a number of possible solutions may be implemented separately or jointly. That is, although these possible solutions may be described below separately, two or more of these possible solutions may be implemented in one combination or another.

Embodiments of the invention provide a lightbulb having a light source which is obscured from view of an observer. This is achieved by a lens arrangement that manipulates a path of light rays so that light incident to the lightbulb at certain angles (with respect to an optical axis) may avoid certain areas within the lightbulb. More specifically, an outer convergent lens of the lens arrangement converges light rays that enter the outer convergent lens at a same first angle to define a shadow region in which at least part of the light source is positioned. The shadow region is an area/volume avoided by light rays that enter the outer convergent lens at a first angle. In this way, an object placed in the shadow region may be masked or shielded from view by an individual viewing from at least the first angle (i.e. the object in the shadow region are not imaged).

As a result of the lens arrangement, the light source within the lightbulb may not be visible when the lightbulb is viewed from certain angles. Indeed, the light source within the lightbulb may not form an image. This may be advantageous when it is desirable to not see an unattractive light source, such as yellow LEDs, or to reduce an effect of glare.

Some embodiments of the invention may provide an outer converging lens as an envelope or cover for the lightbulb, which may obscure vision of a light source/filament. The lens arrangement may comprise the outer converging lens and an inner converging lens to manipulate a light path (i.e. by a shape of the lens, or a diffractive index of materials of the lens).

Moreover, other embodiments of the invention may include a light source that is configured with a principal direction of output light away from the lens arrangement. In this way, the loss of light from the light source may be reduced.

Figure 1B:
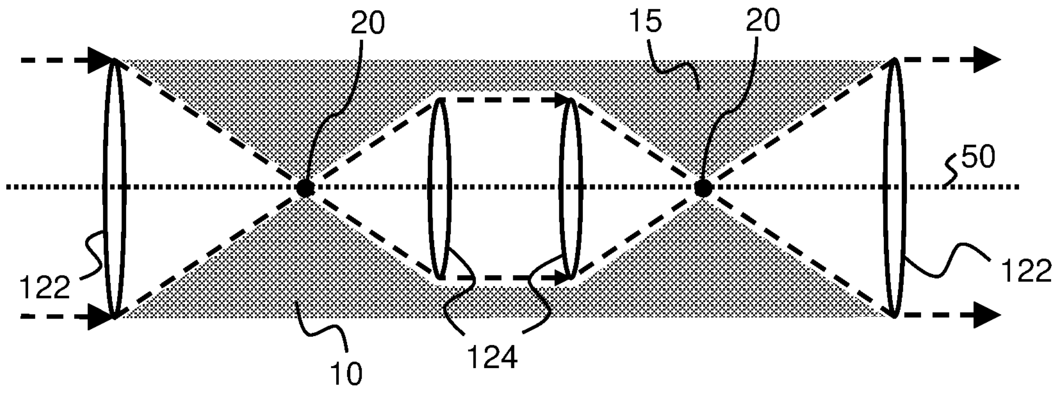
Figure 1C:
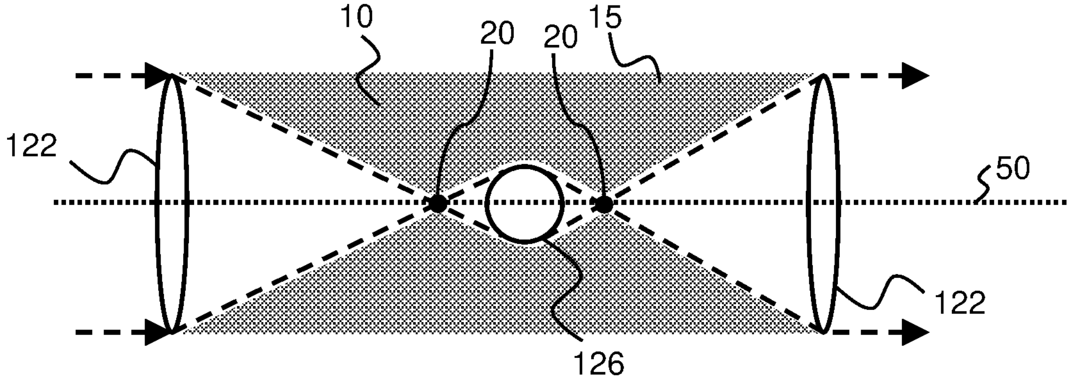

Turning to FIGS. 1A to 1C, there are provided simplified depictions of various lens arrangements for producing a shadow region within a lightbulb. FIG. 1A presents a lens arrangement comprising just an outer convergent lens 122, while FIGS. 1B and 1C present lens arrangements comprising an outer convergent lens 122 and an inner convergent lens 124, 126. A path of light through the lens arrangement is represented by the dotted line.

As presented, the outer convergent lens 122 converges light rays that enter the outer convergent lens 122 at a same first angle with respect to an optical axis 50. Here, all light rays are parallel to the optical axis (e.g., the first angle is 0° with respect to the optical axis 50), for the sake of illustrative ease. Such light rays may be redirected to a focal point 20. In this way, light rays that enter the outer convergent lens 122 at the first angle may be directed away from a shadow (i.e. cloaked/obscured) region 10. Thus, the outer convergent lens 122 defines a shadow region 10.

It will be appreciated that the location of the shadow region 10 varies depending on the first angle with respect to the optical axis 50. However, parts of the shadow region 10 may be in common for a range of different angles. As a result, a light source (or indeed, any object) provided in the shadow region 10 is not observable from the first angle with respect to the optical axis 50, and may not be observable for a range of angles depending on where in the shadow region 10 the light source is provided.

As shown, the outer convergent lens 122 may have a convex shaped cross section. In this way, light rays incident to the outer convergent lens 122 may be focused/be redirected to converge to a point 20. However, the skilled person would appreciate that alternative lens shapes and configurations may converge light rays. For example, the convergent lens 122 may also be a plano-convex, or a concave-convex/meniscus lens. By way of further example, the outer convergent lens 122 may be a flat lens that converges light rays by use of metamaterials (i.e. a composite material having a structure such that it exhibits properties not usually found in the natural material, such as a selected refractive index).

Examples of converging lenses formed from metamaterials are known in the art. One example is described by US Patent Application having Publication No. US2020/355913 A1. Another example is described by European Patent Application having Publication No. EP 3,667,376 A1.

As presented in FIG. 1A-1C, the outer convergent lens 122 may also be provided at a light exit, so that light exiting the lightbulb may reconverge to a first angle. In this way, it may be possible to "see through" the lightbulb at certain angles without seeing the light source, and without distortion of the image.

In some embodiments, the outer convergent lens 122 may be formed in a torus shape and may be positioned to surround the light source. In other words, the outer convergent lens 122 may be formed in a loop around the light source. As a result, light rays that enter the outer convergent lens 122 thereby define a shadow region 10 in which the light source may be at least partially positioned, and then the outer convergent lens receives said light rays a second time at a different location, correcting a light path of the light rays.

FIG. 1A shows one embodiment where the focal point 20 of light incident to the outer convergent lens 122 at a same first (incidence) angle lies at the centre of the outer convergent lens 122 formed in a torus (i.e. loop) shape. In this way, light that enters the outer convergent lens 122 may converge on a focal point 20 in the centre of the outer convergent lens 122 before diverging. The diverging light rays may then be incident on another side of the outer convergent lens 122, reconverging the light rays so that they are output from the outer convergent lens 122 at a same angle as they were originally input.

In this way, light may pass through the lightbulb without distortion (although the light will be vertically flipped/will be imaged upside-down), and while providing a shadow region 10 for cloaking/hiding a light source.

FIGS. 1B and 1C present a configuration of a lens arrangement further comprising an (optional) inner convergent lens 124, 126.

By way of explanation, after the light rays are converged by the outer convergent lens 122, the converged light rays form diverging light rays. In other words, a focal point 20 for light entering at the same first angle may lie between the outer convergent lens 122 and the inner convergent lens 124, 126.

In this case, the lens arrangement may further comprise an inner convergent lens 124, 126 configured to receive the diverging light rays and reconverge the diverging light rays to thereby define a second (i.e a second part) shadow region 15, being a region in the lightbulb avoided by the light rays that enter the outer convergent lens 122 at the first angle as a result of the converging performed by the outer convergent lens 122 and the reconverging performed by the inner convergent lens 124, 126.

It will be appreciated that the first shadow region 10 and the second shadow region 15 may at least partially overlap. Thus, the first shadow region 10 and second shadow region may together form or define a single shadow region avoided by light rays that enter the outer convergent lens 122 as the first angle with respect to the optical axis 50.

After reconverging the light rays, the light rays may then be provided again to the outer convergent lens 122, so that light initially input to the outer convergent lens 122 at a first angle with respect to the optical axis, may be output from the lens arrangement at the same first angle with respect to the optical axis. In this way, it may be possible for a viewer to effectively "see through" the lens arrangement at certain angles, while not observing objects in the first part of the shadow region 10 or second part of the shadow region 15.

Indeed, the lens arrangements of FIGS. 1B and 1C have the added benefit over the lens arrangement of FIG. 1A in that the light rays are not vertically flipped. In other words, the image may be erect. As such, an observer may receive light as though the lens arrangement is not present.

As shown in FIG. 1B, the inner convergent lens 124 may be formed in a torus shape and may be positioned concentrically with the outer convergent lens 122. Put another way, the inner convergent lens 124 may be formed in a loop and positioned concentrically with the torus shaped/looped outer convergent lens 122. This may ensure uniform light manipulation regardless of where the light is input/incident to the outer convergent lens 122, given a same angle of incidence.

Furthermore, similarly to embodiments of the outer convergent lens 122, the inner convergent lens 124 may have a convex shaped cross section. In this way, diverging light rays incident to the inner convergent lens 124 may be focused/be redirected to be less divergent, be substantially parallel, or reconverge. However, the skilled person would appreciate that alternative lens shapes and configurations may have the same impact on incident light rays. For example, the inner convergent lens 124 may be a plano-convex, or a concave-convex/meniscus lens. By way of further example, the inner convergent lens 124 may be a flat lens that converges light rays by use of metamaterials, i.e., is a metalens.

In alternative embodiments, and as presented in FIG. 1C, the inner convergent lens 126 may be formed in a spherical shape. In this case, the inner convergent lens 126 may be positioned in the centre of a toroid/loop shaped outer convergent lens 122. In this way, the lens arrangement may be more compact, and so the overall lightbulb may have a smaller size.

Figure 2:
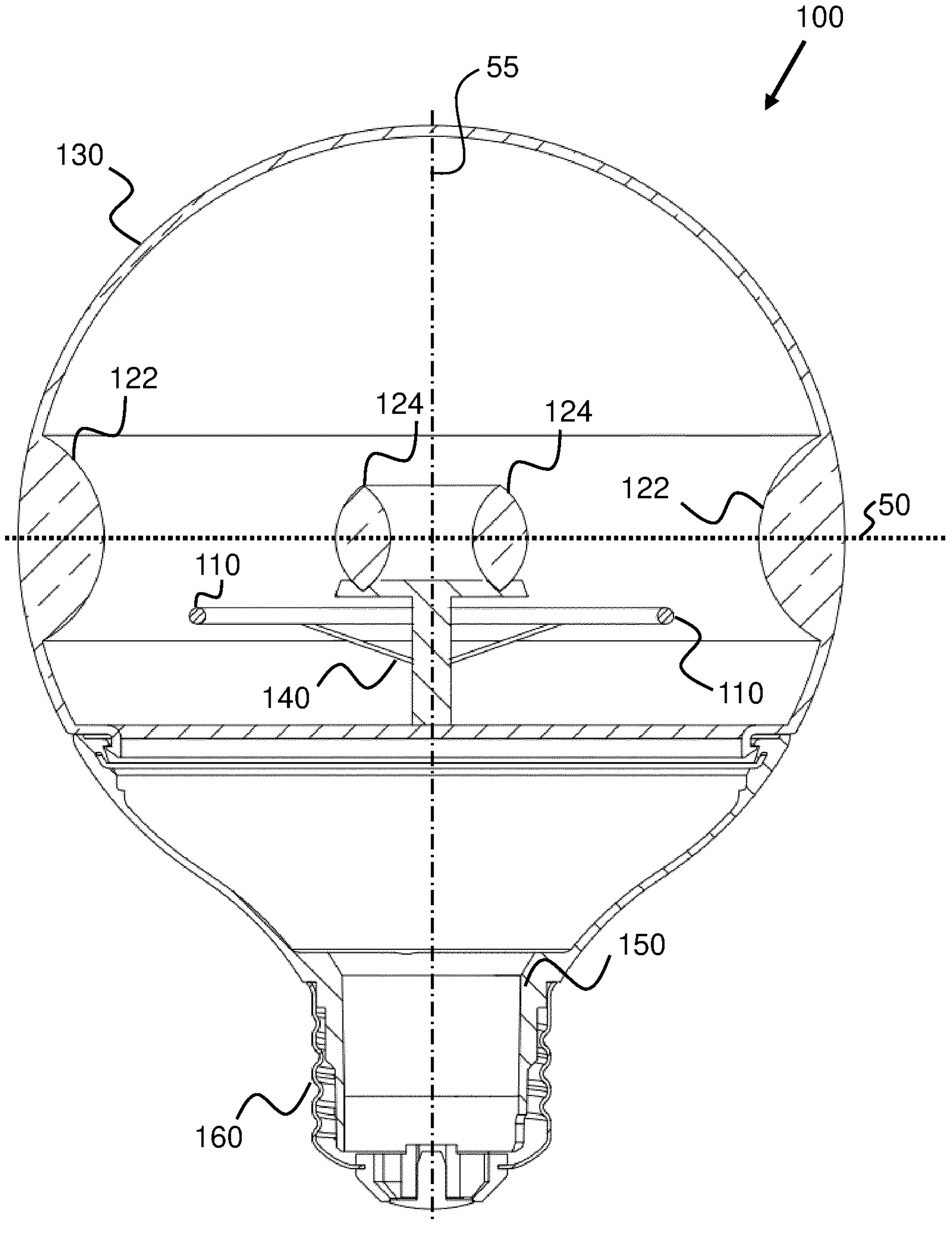
FIG. 2 is a cross section of a lightbulb according to an embodiment.
Figure 3:
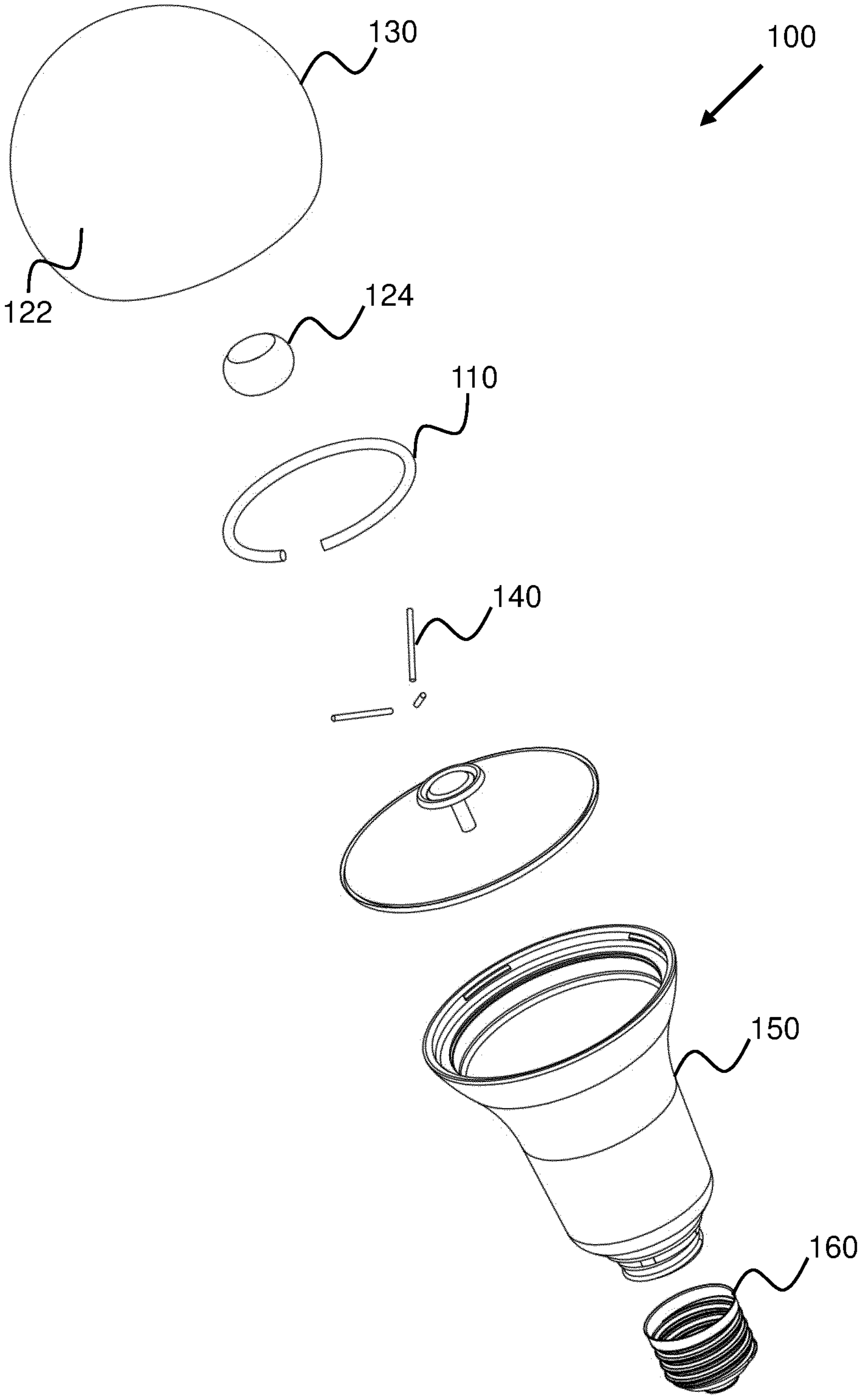
FIG. 3 is an exploded isometric view of the lightbulb illustrated in FIG. 2.

Moving on to FIG. 2, there is presented a diagram of a cross section of a lightbulb 100 according to an embodiment of the invention. FIG. 3 provides an exploded isometric view of the lightbulb 100 presented in FIG. 2.

In particular, there is provided a lens arrangement having both an outer convergent lens 122 and an inner convergent lens 124, configured as described in relation to FIG. 1B above.

The depicted outer convergent lens 122 and inner convergent lens 124 are both provided in a torus/loop shape, and positioned concentrically. Moreover, both the depicted outer convergent lens 122 and inner convergent lens 124 have a convex cross section shape. Indeed, the convex cross section shape of both the outer convergent lens 122 and inner convergent lens 124 may have a primary axis 55 that is parallel with the primary axis of the torus shapes of both the outer convergent lens 122 and inner convergent lens 124 (i.e. an axis perpendicular to the plane of the torus/loop).

The lightbulb 100 may also comprise an enclosure 130 adapted to house the lens arrangement and the light source 110. The enclosure 130 is formed of a transparent or translucent material to ensure illumination from the light source 110 is capable of dissipating or being transmitted to the surroundings. For example, the material of the enclosure 130 may be glass or a plastic.

In the depicted embodiment, the enclosure 130 has a circular shaped cross section. However, in alternative embodiments the enclosure 130 may have a candle flame shaped, a pear shaped, a mushroom shaped cross section, or any shape appropriate to house the lens arrangement and light source 110.

In some embodiments, and as depicted in FIG. 2, the enclosure 130 may comprise the outer convergent lens 122. In other words, the outer convergent lens 122 may form part of the enclosure 130, such that the outer convergent lens 122 is seamlessly formed with the enclosure 130. In such a case, the lightbulb 100 may have a more compact and robust form. Alternatively, the outer convergent lens 122 may be formed separately from the enclosure 130.

As described above in reference to FIGS. 1A-1C, the outer convergent lens 122 and inner convergent lenses 124 form a shadow region within the lightbulb 100. The light source 100 presented in FIGS. 2 and 3 is thus provided within the shadow region of the lightbulb 100, and is thereby obscured/hidden/cloaked from view at certain angles.

In the present embodiment, the light source 110 is provided in a torus/loop shape that is concentric with the outer convergent lens 122, so that the light source 100 may occupy a large volume of the shadow region. As such the light source 110 is provided in both a first and a second shadow region.

However, it should be appreciated that the light source 110 may be placed anywhere at least partially within the shadow region, and in any shape. A torus shape is depicted here as merely one example. By way of another example, the light source 110 may comprise a plurality of discrete light sources spaced apart within the shadow region.

In some embodiments, the light source 110 may comprise a single diode or a plurality of light emitting diodes (LEDs). For instance, the light source 110 may comprise only one LED or LED group, or may comprise a string of LEDs. However, this is not meant to restrict the possible light sources utilised by embodiments of the invention. The skilled person would readily appreciate suitable alternative sources of illumination that may be utilised in the present invention, such as filaments.

Moreover, the light source 110 may be configured to emit light towards a part of the enclosure 130 other than the outer convergent lens 122. For instance, a light exit window of the light source 110 may face a part of the enclosure 130 other than the outer convergent lens 122. For example, the light exit window may face substantially upward, so that most light is irradiated out of the enclosure 130 in a direction not incident to the lens arrangement. Put another way, the primary direction of light output from the light source 110 may avoid the lens arrangement. In this way, an optical efficiency of the lightbulb 100 may be improved.

Furthermore, the lightbulb 100 may optionally comprise a support means/inner structure 140 for mechanically providing the light source 110 and/or inner convergent lens 122. At least part of the structure 140 may be provided within the shadow region, such that a visibility of the structure 140 may be reduced when viewed from certain angles. The support means/structure 140 may also provide an electrical connection to the light source 110.

Additionally, the lightbulb 100 may comprise a bulb housing 150 or bulb mount. The bulb housing 150 may be suitable for mechanically supporting the lens arrangement, light source 110 and/or enclosure 130. Yet further, the lightbulb 100 may also comprise a bulb cap 160 for fitting the lightbulb 100 to a lightbulb receiving socket (not shown). Thus, the bulb cap 160 provides a means for mounting the lightbulb 100 on a wall, ceiling, or any other surface. In some embodiments, the bulb cap 160 may be a screw cap, a pin and push cap or a bayonet cap. However, embodiments are not restricted to these, and the bulb cap 160 be any means suitable for fitting the lightbulb 100 to a lightbulb receiving socket.

Figure 4:
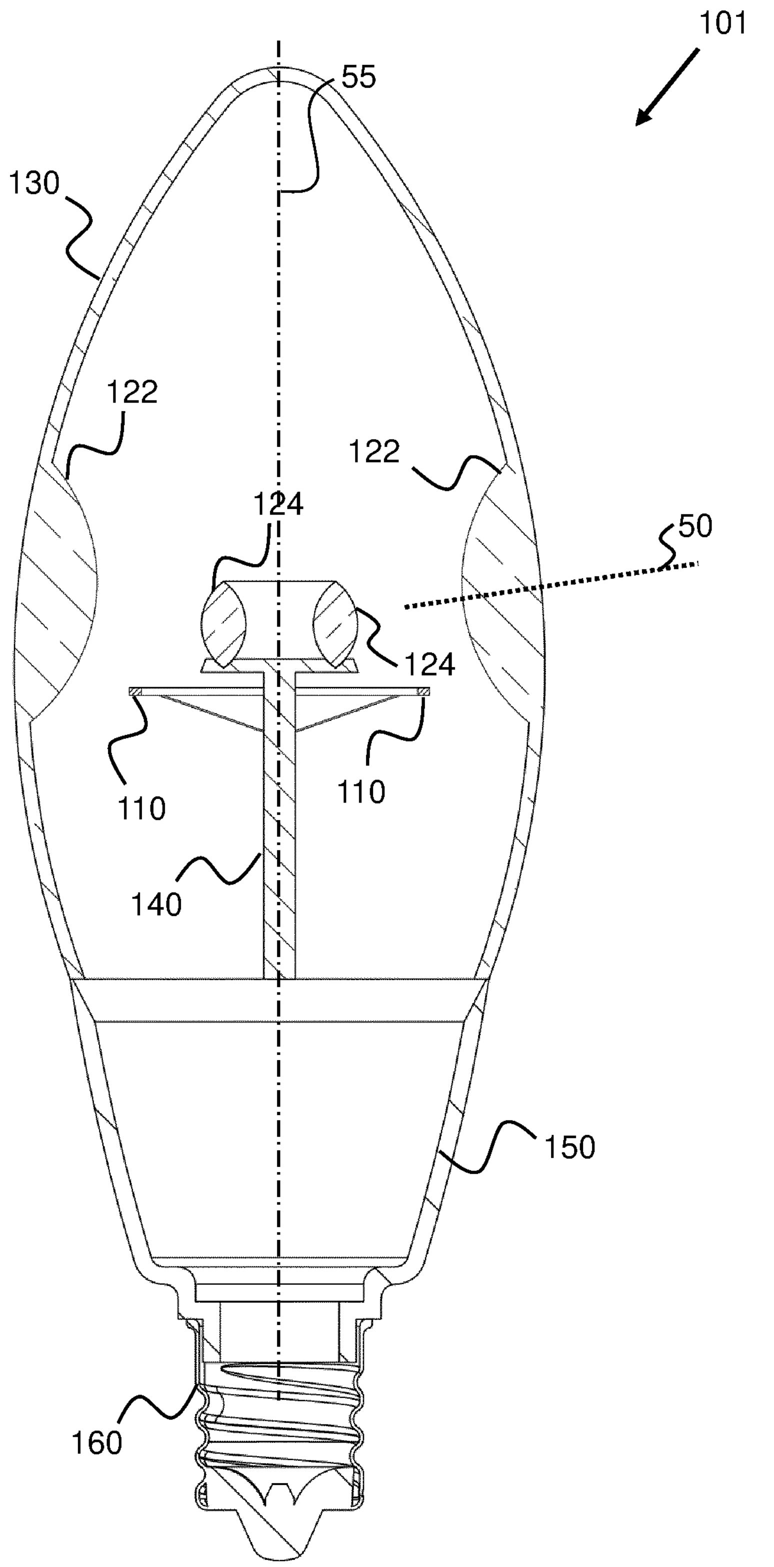
FIG. 4 is a cross section of a lightbulb according to a further embodiment.

FIG. 4 presents a cross section of a lightbulb 101 according to a further embodiment of the invention. The lens arrangement, light source 110, supporting means 140, bulb housing 150 and bulb cap 160 may be substantially similar to those depicted in FIGS. 2 and 3, and therefore further description of these features is omitted here for the sake of brevity.

Indeed, the lightbulb 101 of FIG. 4 differs from the lightbulb 100 of FIGS. 2 and 3 in that the enclosure 130 of FIG. 4 is candle flame shaped. Thus, the lightbulb 101 may have a thinner/narrower shape.

Accordingly, the inner convergent lens 124 and outer convergent lens 122 may be adjusted to greater converge incident light at the outer convergent lens that makes a same first angle with respect to an optical axis 50, such that a focal point of light rays input to the outer convergent lens 122 is nearer/closer to the outer convergent lens 122. The same applies to the inner convergent lens 124. The skilled person would fully understand how to adjust physical characteristics of the outer convergent lens 122 and inner convergent lens 124 such that optical characteristics of the lenses are suitable to reduce visibility of the light source 110 using the principals described in reference to FIGS. 1A-1C.

Figure 5:
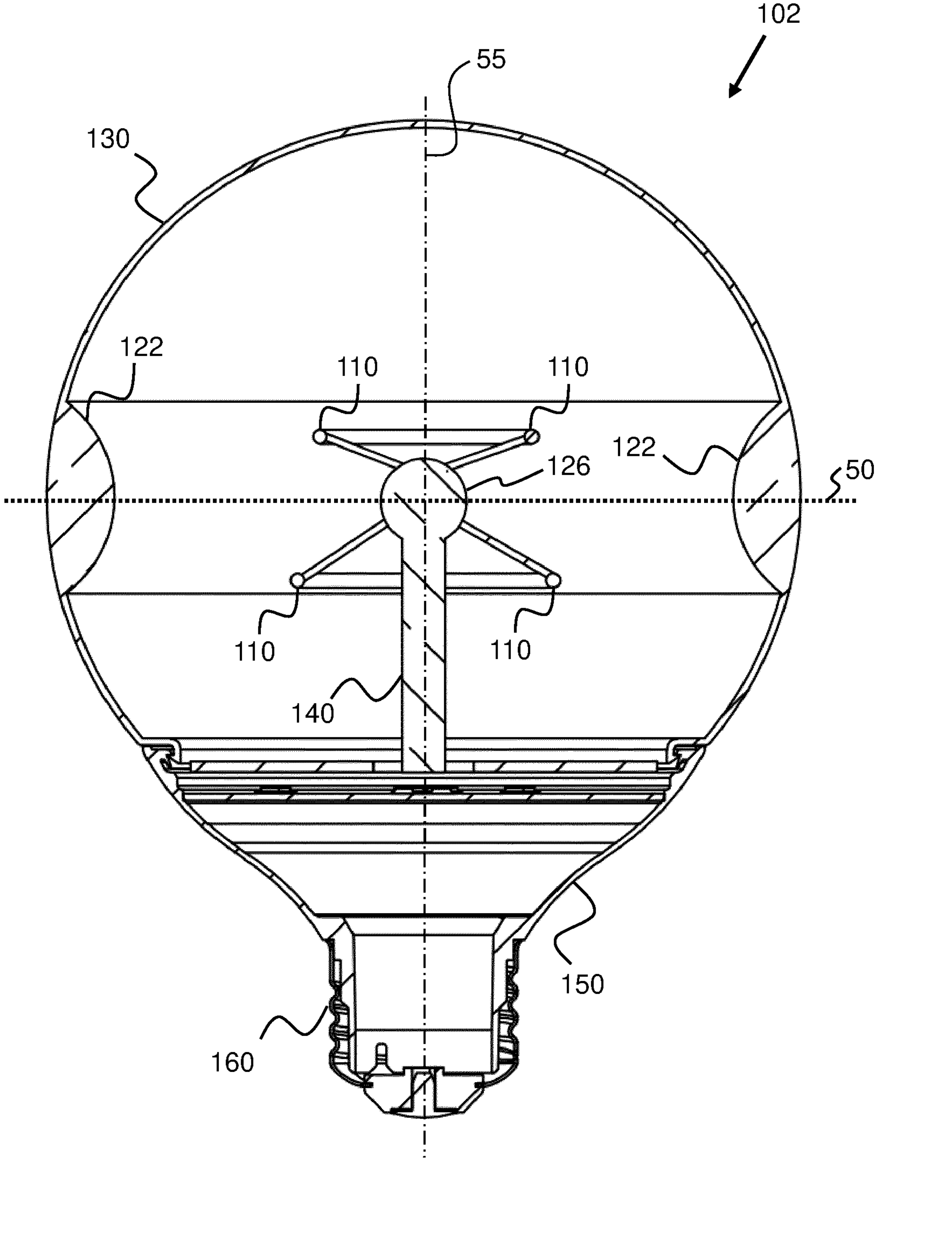
FIG. 5 is a cross section of a lightbulb according to yet another embodiment.
Figure 6:
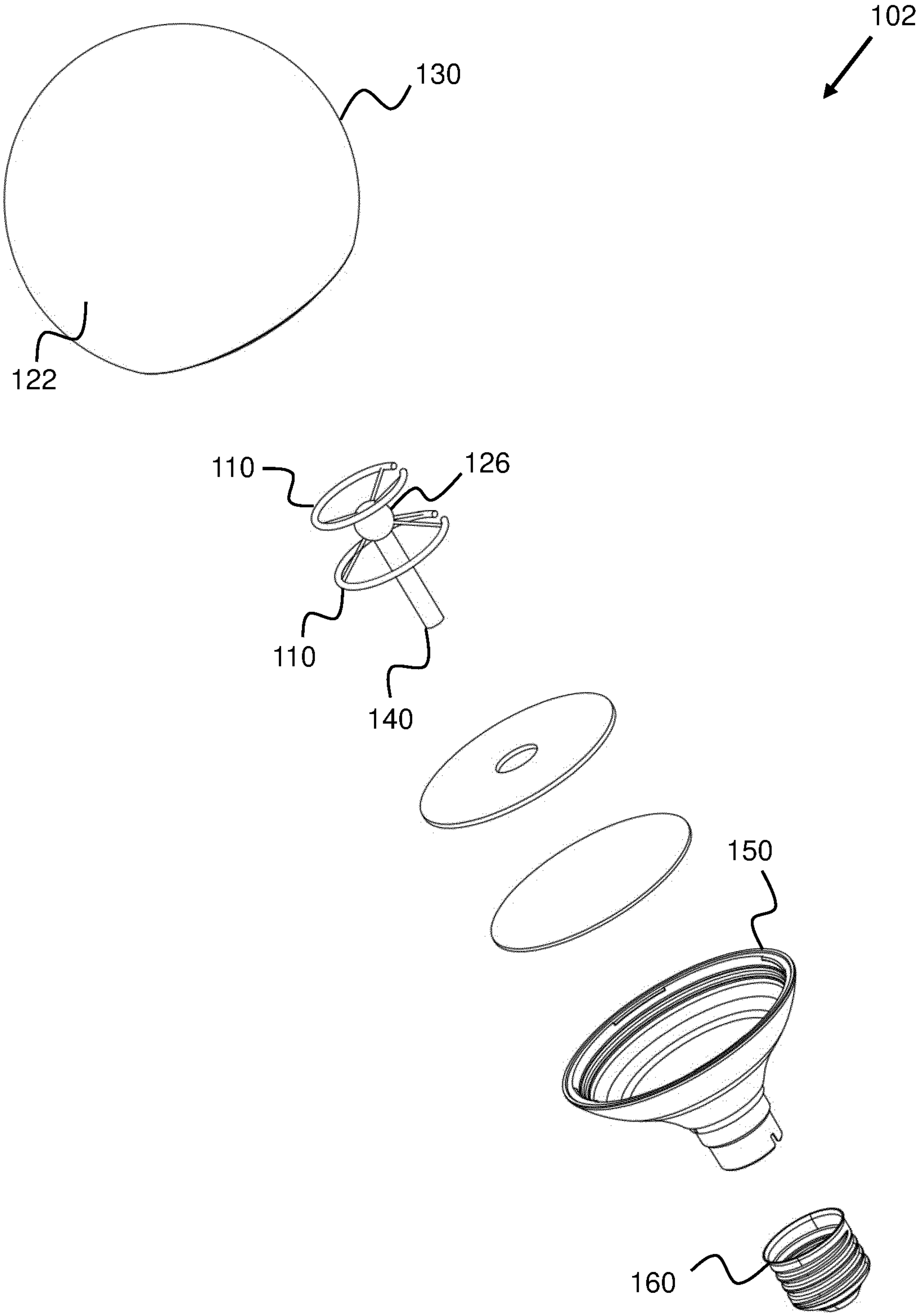
FIG. 6 is an exploded isometric view of the lightbulb illustrated in FIG. 5.

FIG. 5 provides a diagram of a cross section of a lightbulb 102 according to an embodiment of the invention. FIG. 6 provides an exploded isometric view of the lightbulb 102 presented in FIG. 5. The outer convergent lens 122, enclosure 130, supporting means 140, bulb housing 150 and bulb cap 160 may be substantially similar to those depicted in FIGS. 2 and 3, and therefore further description of these features is omitted here for the sake of brevity.

The depicted lightbulb 102 differs from the lightbulb 102 of FIGS. 2 and 3 in that there is provided a layered light source 110 in the form of two different torus shaped light sources 110. The first light source 110 is provided in an upper area of the shadow region, and the second light source 110 is provided in a lower area of the shadow region. In this way, a light output may be increased while ensuring that the light source 110 remains obscured, by utilising a larger volume of the shadow region.

Furthermore, the depicted lightbulb 102 differs in that the inner converging lens 126 is a spherical lens. In this way, the lightbulb 102 may be more compact than when a torus shaped inner converging lens 124 is provided.

The mere fact that certain measures are recited in mutually different dependent claims does not indicate that a combination of these measures cannot be used to advantage.

Any reference signs in the claims should not be construed as limiting the scope.

The invention claimed is:

1. A lightbulb comprising:

a light source;

a lens arrangement comprising:

an outer convergent lens configured to converge light rays that enter the outer convergent lens at a same first angle, with respect to an optical axis of the outer convergence lens, to thereby define a shadow region, being a region in the lightbulb avoided by the light rays that enter the outer convergent lens at the first angle as a result of the converging performed by the outer convergent lens, wherein the light source is positioned such that at least part of the light source is in the shadow region defined by the outer convergent lens;

wherein the outer convergent lens is formed in a torus shape and is positioned to surround the light source;

wherein the shadow region is a volume corresponding to an intersection of a volume surrounded by the torus shape of the outer convergent lens and a volume avoided by the light rays that enter the outer convergent lens at the first angle as a result of the converging performed by the outer convergent lens.

2. The lightbulb of claim 1, wherein the light source is provided in a torus shape.

3. The lightbulb of claim 1, wherein the outer convergent lens has a convex shaped cross section.

4. The lightbulb of claim 1, wherein:

after being converged by the outer convergent lens, the converged light rays form diverging light rays;

the lens arrangement further comprises an inner convergent lens configured to receive the diverging light rays and reconverge the diverging light rays to thereby define a second shadow region, being a region in the lightbulb avoided by the light rays that enter the outer convergent lens at the first angle, with respect to the optical axis of the outer convergence lens, as a result of the converging performed by the outer convergent lens and the reconverging performed by the inner convergent lens.

5. The lightbulb of claim 4, wherein the light source is positioned such that at least part of the light source is in the second shadow region defined by the inner convergent lens.

6. The lightbulb of claim 4, wherein the inner convergent lens is formed in a torus shape and is positioned concentrically with the outer convergent lens.

7. The lightbulb of claim 4, wherein the inner convergent lens has a convex shaped cross section.

8. The lightbulb of claim 4, wherein the inner convergent lens is formed in a spherical shape.

9. The lightbulb of claim 1, further comprising an enclosure for housing the lens arrangement and the light source, wherein the enclosure is formed of a transparent or translucent material.

10. The lightbulb of claim 9, wherein the enclosure comprises the outer convergent lens.

11. The lightbulb of claim 10, wherein the light source is configured to emit light towards at least a part of the enclosure other than the outer convergent lens.

12. The lightbulb of claim 9, wherein the enclosure has a candle flame shaped, a bulbous shaped or a circular shaped cross section.

13. The lightbulb of claim 1, wherein the light source comprises a filament of light emitting diodes.

* * * * *